US012037157B2

(12) United States Patent
Nakamura et al.

(10) Patent No.: US 12,037,157 B2
(45) Date of Patent: Jul. 16, 2024

(54) SYSTEM FOR MANUFACTURING CARDBOARD BOX WITH ELECTRONIC TAG AND METHOD THEREFOR

(71) Applicant: DAIO PAPER CORPORATION, Shikokuchuo (JP)

(72) Inventors: Isamu Nakamura, Odawara (JP); Ryoto Takahashi, Odawara (JP); Taro Ikawa, Shikokuchuo (JP)

(73) Assignee: DAIO PAPER CORPORATION, Shikokuchuo (JP)

( * ) Notice: Subject to any disclaimer, the term of this patent is extended or adjusted under 35 U.S.C. 154(b) by 265 days.

(21) Appl. No.: 17/639,629

(22) PCT Filed: Sep. 4, 2020

(86) PCT No.: PCT/JP2020/033651
§ 371 (c)(1),
(2) Date: Mar. 2, 2022

(87) PCT Pub. No.: WO2021/045208
PCT Pub. Date: Mar. 11, 2021

(65) Prior Publication Data

US 2022/0289419 A1 Sep. 15, 2022

(30) Foreign Application Priority Data

Sep. 6, 2019 (JP) ................................. 2019-163374

(51) Int. Cl.
*B32B 41/00* (2006.01)
*B31B 50/26* (2017.01)
(Continued)

(52) U.S. Cl.
CPC ................ *B65C 9/30* (2013.01); *B31B 50/26* (2017.08); *B31B 50/81* (2017.08); *B31B 50/88* (2017.08);
(Continued)

(58) Field of Classification Search
CPC .... B65C 9/30; B65C 9/28; B65C 9/42; B65C 2009/0003; B31B 50/26; B31B 50/81;
(Continued)

(56) References Cited

U.S. PATENT DOCUMENTS 7,605,708 B2 * 10/2009 Cote ................ G06K 19/07749 340/568.1
2007/0018824 A1 * 1/2007 Clare ............... G06K 19/07779 340/572.1
2007/0193910 A1 * 8/2007 Ernst ....................... D21F 9/006 206/459.1

FOREIGN PATENT DOCUMENTS

JP 46-40676 B1 12/1971
JP 58139414 U 9/1983
(Continued)

OTHER PUBLICATIONS

International Search Report issued on Nov. 24, 2020 in corresponding International application No. PCT/JP2020/033651; 5 pages.

*Primary Examiner* — Michael N Orlando
*Assistant Examiner* — Joshel Rivera
(74) *Attorney, Agent, or Firm* — Maier & Maier, PLLC

(57) ABSTRACT

A system of manufacturing a corrugated cardboard box to which an electronic tag is attached. The system includes: a corrugated cardboard sheet forming part that forms a corrugated cardboard sheet 14*p*; a blank forming part that forms a box blank 24*p* from the corrugated cardboard sheet; a folder gluer that assembles the box blank 24*p* into a flat plate-shaped corrugated cardboard box; a product stacker that stacks the flat plate-shaped corrugated cardboard box assembled in the folder gluer; and a tag sticking device that sticks the electronic tag having an adhesive portion to a surface that becomes an outer surface of a box as a work-
(Continued)

piece by using the adhesive portion between the corrugated cardboard sheet forming part and the product stacker.

10 Claims, 13 Drawing Sheets

(51) Int. Cl.

| | |
|---|---|
| ***B31B 50/81*** | (2017.01) |
| ***B31B 50/88*** | (2017.01) |
| ***B65C 9/28*** | (2006.01) |
| ***B65C 9/30*** | (2006.01) |
| ***B65C 9/42*** | (2006.01) |
| *B31B 100/00* | (2017.01) |
| *B65C 9/00* | (2006.01) |

(52) U.S. Cl.
CPC .................. *B65C 9/28* (2013.01); *B65C 9/42* (2013.01); *B31B 2100/00* (2017.08); *B65C 2009/0003* (2013.01)

(58) Field of Classification Search
CPC ... B31B 50/88; B31B 2100/00; B31B 50/042; B31B 50/8129
USPC .................... 156/60, 64, 350, 351, 378, 379
See application file for complete search history.

(56) References Cited

FOREIGN PATENT DOCUMENTS

| | | | |
|---|---|---|---|
| JP | 2007-145419 | A | 6/2007 |
| JP | 2007-216683 | A | 8/2007 |
| JP | 2011-201579 | A | 10/2011 |
| JP | 2018-538181 | A | 12/2018 |
| JP | 6484379 | B1 | 3/2019 |

* cited by examiner

[FIG. 1]
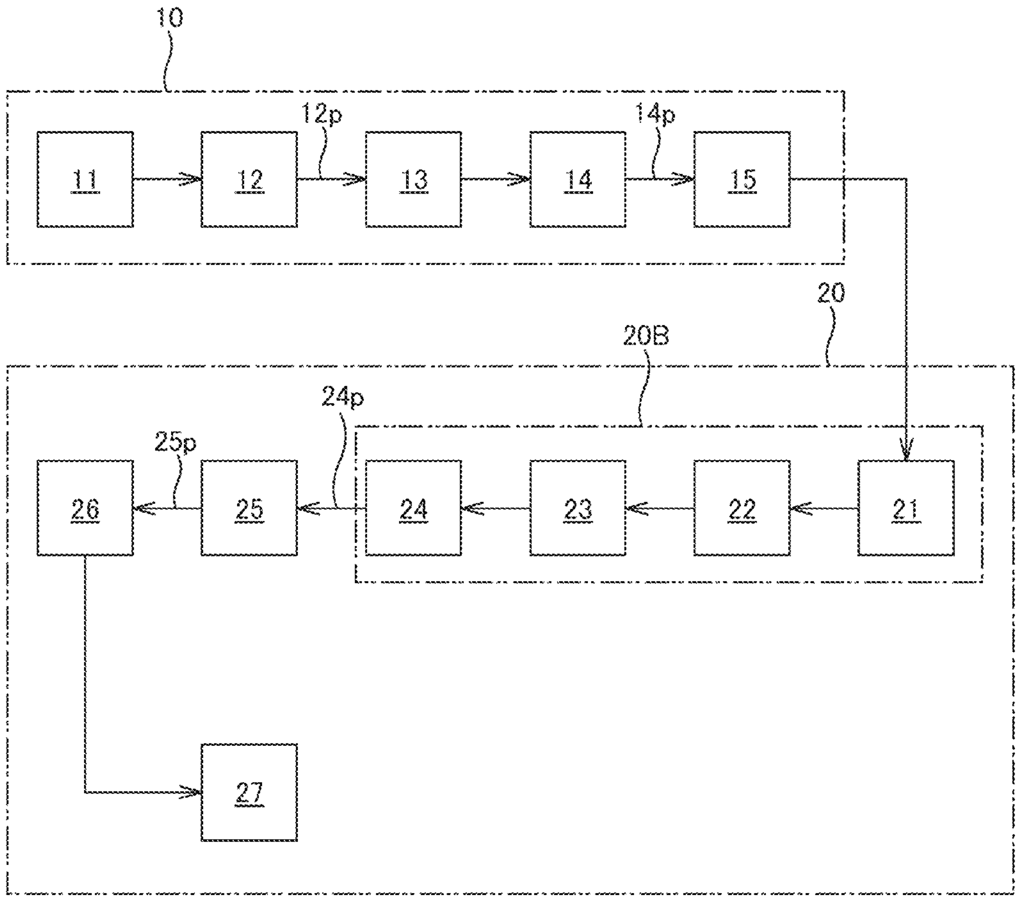

[FIG. 3]
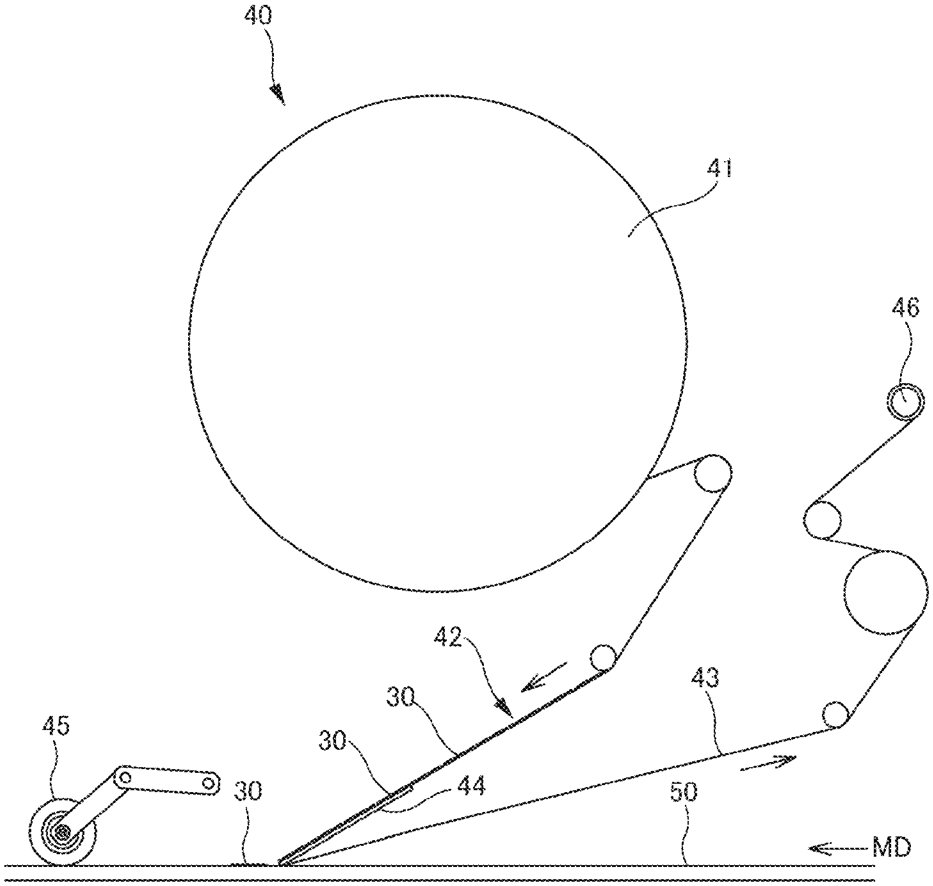

[FIG. 4]
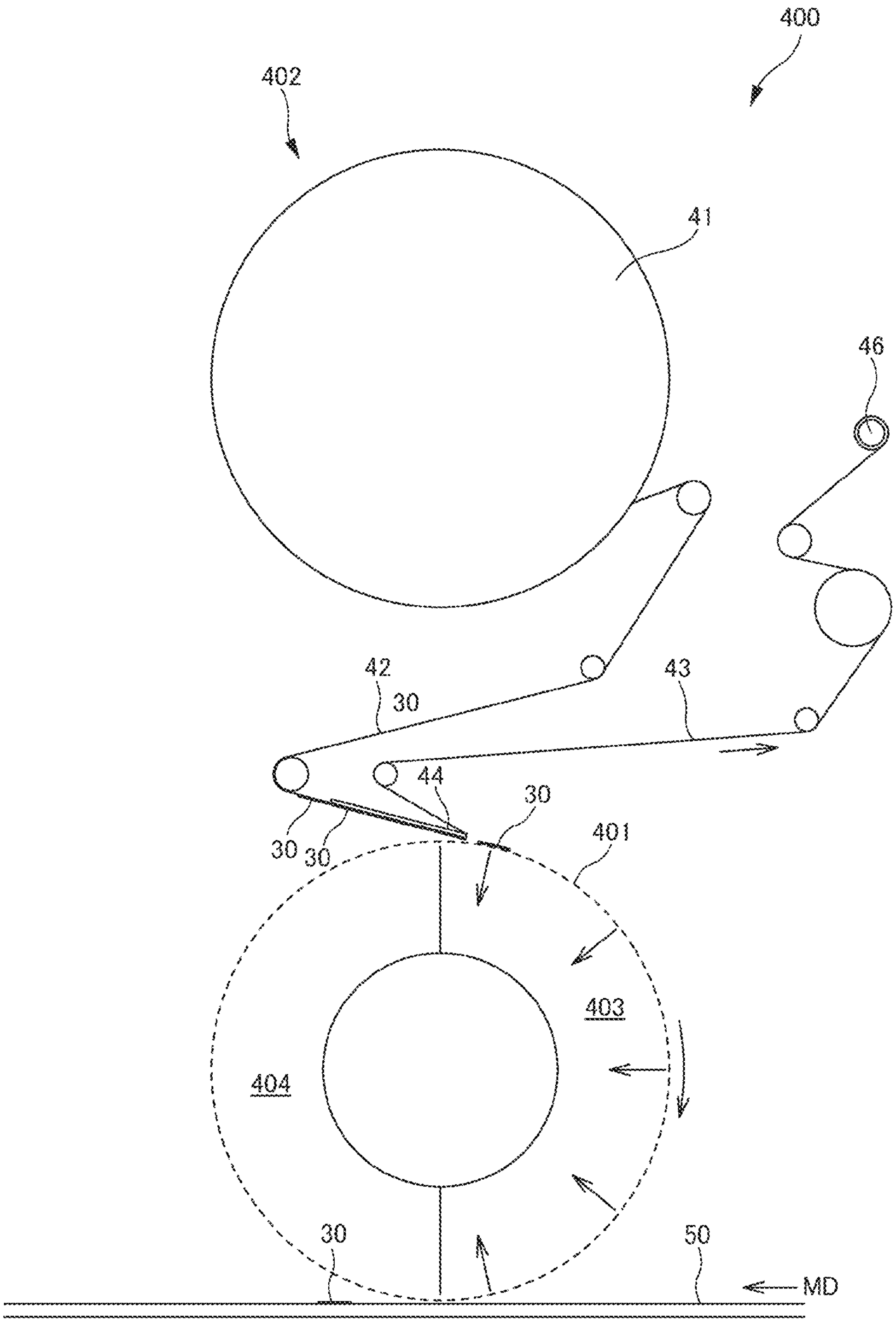

[FIG. 5]
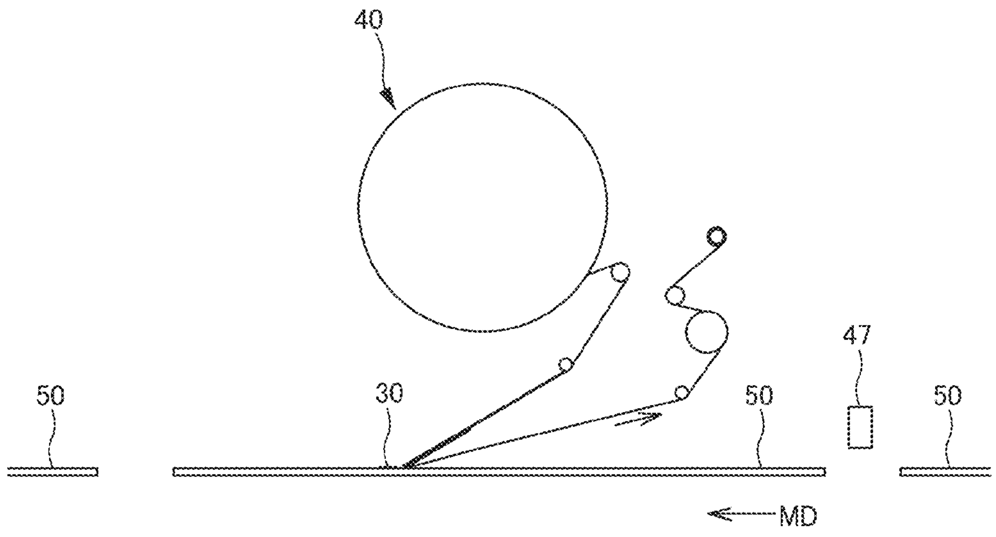

[FIG. 6]
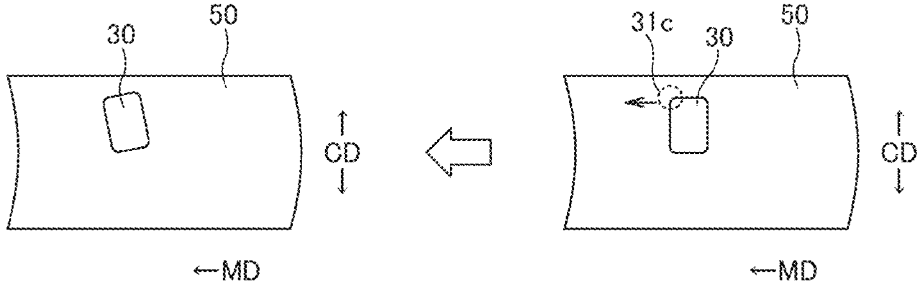

[FIG. 9]
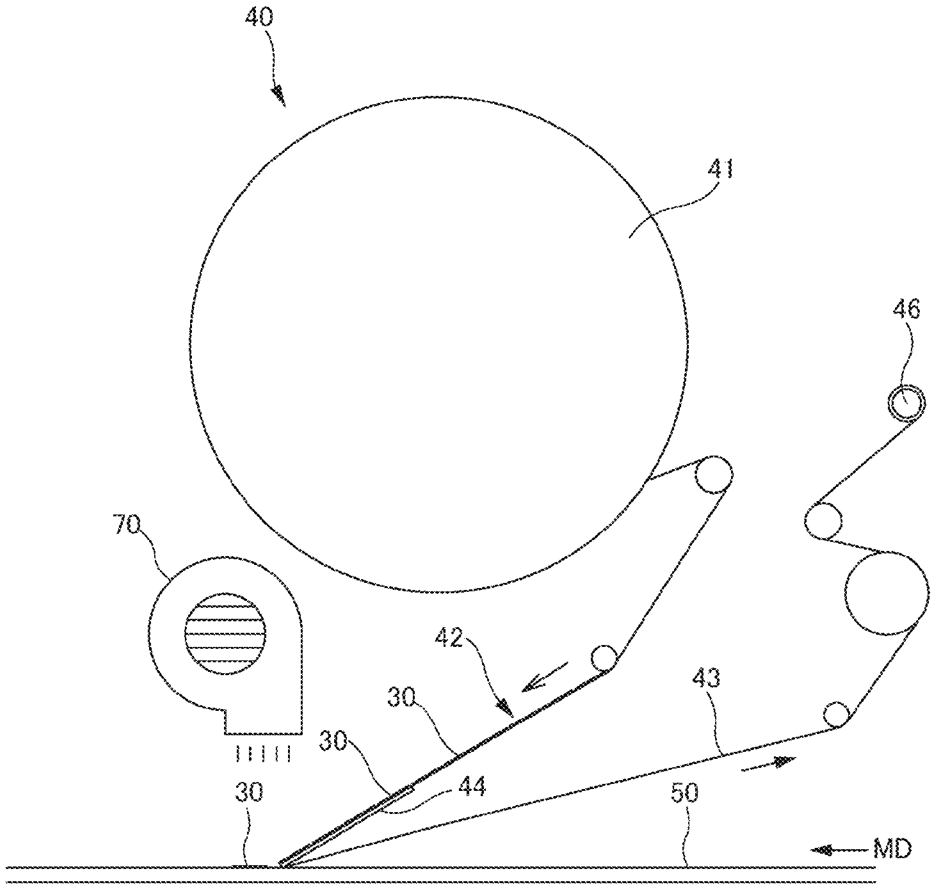

[FIG. 10]
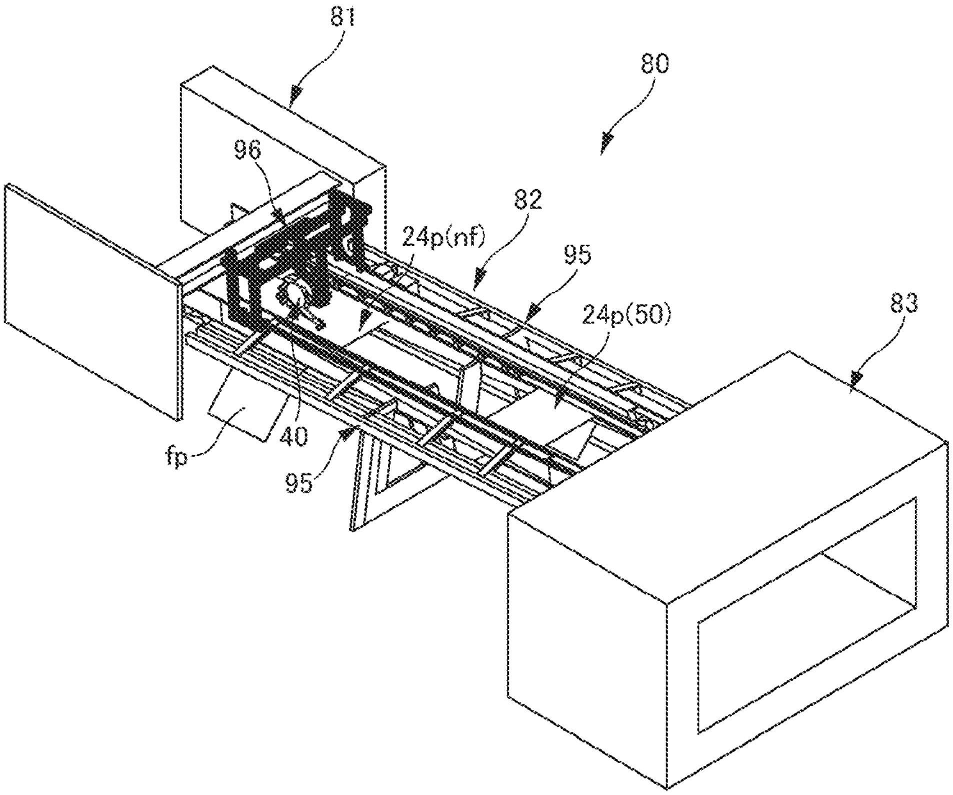

SYSTEM FOR MANUFACTURING CARDBOARD BOX WITH ELECTRONIC TAG AND METHOD THEREFOR

FIELD

The present invention relates to a system of manufacturing an electronic tag-attached corrugated cardboard box, and a method for the same.

BACKGROUND

Reading/writing can be wirelessly performed in a non-contact manner with respect to an electronic tag, and the electronic tag can store a large amount of information, and thus the electronic tag is expected to be applied as an alternative to optically readable codes such as a barcode. As one of the application, it is suggested that the electronic tag is embedded in a corrugated cardboard box at the time of manufacturing the corrugated cardboard box.

For example, Patent Document 1 suggests a technology of embedding the electronic tag between adhesive surfaces of joint portions, and Patent Document 2 suggests a technology of embedding the electronic tag between a liner and a core.

When using a corrugated cardboard box embedded with an electronic tag, a manufacturer of the corrugated cardboard box or a user who purchases and uses the corrugated cardboard box can perform production management, distribution management, inventory management, quality management, and the like by writing various pieces of information to the electronic tag and reading information written to the electronic tag in a distribution process or at a selling store, in advance.

However, in the technologies described in Patent Document 1 and Patent Document 2, since the electronic tag is sandwiched between adhesive surfaces, there is a concern that the electronic tag is broken due to a force or heat applied to the electronic tag when the adhesive surfaces are compressed.

In addition, in the technologies described in Patent Document 1 and Patent Document 2, since the electronic tag embedded in the corrugated cardboard box cannot be visually recognized from the outside, when performing reading/writing of information of the electronic tag, there is a problem that it is difficult to align a reader/writer to an appropriate position of the electronic tag, or a problem that it is difficult to confirm whether or not the electronic tag is normally embedded.

Patent Document

Patent Document 1: JP-A-2007-145419
Patent Document 2: JP-A-2007-216683
Patent Document 3: Japanese Patent No. 6,484,379

SUMMARY

Here, a main object of the invention is to reduce a concern of breakage of an electronic tag, or the like.

A system of manufacturing an electronic tag-attached corrugated cardboard box and a method for the same which accomplish the object are as follows.

<First Aspect>

A system of manufacturing an electronic tag-attached corrugated cardboard box, including:

- a corrugated cardboard sheet forming part that forms a corrugated cardboard sheet;
- a blank forming part that forms a box blank from the corrugated cardboard sheet;
- an assembly part that assembles the box blank into a flat plate-shaped corrugated cardboard box;
- a product stacking part that stacks the flat plate-shaped corrugated cardboard box assembled in the assembly part; and
- a tag sticking device that sticks an electronic tag having an adhesive portion to a surface that becomes an outer surface of a box as a workpiece by using the adhesive portion between the corrugated cardboard sheet forming part and the product stacking part.

(Operational Effect)

In this manufacturing system, since the electronic tag having an adhesive portion is stuck to a surface that becomes an outer surface of a box as a workpiece by using the adhesive portion between the corrugated cardboard sheet forming part and the product stacking part, a concern of breakage of the electronic tag due to a force or heat as in Patent Document 1 and Patent Document 2 becomes less. In addition, since this manufacturing system uses an adhesive type electronic tag that is widely used, there is also an advantage that universality is high. In addition, since the electronic tag stuck to the outer surface of the corrugated cardboard box is easy to be visually recognized, when performing reading/writing of information of the electronic tag, it is easy not only to align a reader/writer to the electronic tag at an appropriate position, but also to confirm whether or not the electronic tag is normally stuck.

<Second Aspect>

The system of manufacturing an electronic tag-attached corrugated cardboard box according to the first aspect, in which the assembly part includes a folding part that folds the box blank, the folding part folds a folding portion of the box blank that passes through an outer side in a CD direction in comparison to a pair of nipping conveyance devices toward a central side in the CD direction while conveying the box blank in an MD direction by the pair of nipping conveyance devices spaced apart from each other in the CD direction with a non-folding portion of the box blank sandwiched therebetween in a thickness direction, and the tag sticking device sticks the electronic tag to a portion passing between the pair of nipping conveyance devices in the box blank.

(Operational Effect)

An installation position of the tag sticking device is not particularly limited. However, in a case where the folding part that performs folding while conveying the box blank by the pair of nipping conveyance devices is provided as in this aspect, when employing a configuration in which the electronic tag is stuck to a portion passing between the pair of nipping conveyance devices in the box blank, it is easy not only to install the tag sticking device, but also to stick the electronic tag since a conveyance posture of the box blank is stable. Note that, the MD direction represents a conveyance direction of the workpiece in the manufacturing system.

<Third Aspect>

The system of manufacturing an electronic tag-attached corrugated cardboard box according to the second aspect, in which the folding part includes a pair of frames supporting the pair of nipping conveyance devices, respectively, and an interval between the frames in the CD direction is set to be adjustable, the tag sticking device is supported to each of the pair of frames through an extendible frame that is extendible in the CD direction, and when the interval between the pair of frames in the CD direction is adjusted by an adjustment device, the extendible frame extends or contracts in correspondence with the adjustment, and a position of the tag sticking device is maintained.

(Operational Effect)

As in the folding part of this aspect, in a case where the interval between the pair of nipping conveyance devices in the CD direction is adjusted in correspondence with a size change of the corrugated cardboard box, when a position of the tag sticking device is maintained in correspondence with the adjustment, installation position adjustment of the tag sticking device is not necessary or becomes simple at the time of changing the size of the corrugated cardboard box. Accordingly, this configuration is preferable. Note that, the CD direction represents a lateral direction orthogonal to the conveyance direction of the workpiece in the manufacturing system.

<Fourth Aspect>

The system of manufacturing an electronic tag-attached corrugated cardboard box according to any one of the first to third aspects, further including:

a correction roller that comes into contact with at least one of a sticking surface for the electronic tag and the opposite surface in the workpiece, and corrects warpage of the sticking surface at a sticking position of the electronic tag.

(Operational Effect)

As is well known, the corrugated cardboard sheet wraps due to a difference in moisture, tension, or the like between upper and lower liners. Accordingly, in a case where the electronic tag is stuck to an outer surface of the corrugated cardboard box in the system of manufacturing the corrugated cardboard box, warpage of the corrugated cardboard sheet has an influence on a sticking deviation, and there is a concern that the warpage has an influence on breakage of the electronic tag. Accordingly, it is preferable to provide the correction roller that corrects warpage as in this aspect. According to this, the sticking deviation of the electronic tag can be suppressed, and the concern of breakage of the electronic tag can also be reduced.

<Fifth Aspect>

The system of manufacturing an electronic tag-attached corrugated cardboard box according to any one of the first to fourth aspects, further including:

a wind pressure correction device that applies a wind pressure to at least one of a sticking surface for the electronic tag and the opposite surface in the workpiece, and corrects warpage of the sticking surface at a sticking position of the electronic tag.

(Operational Effect)

The similar operational effect as in the fourth aspect can be exhibited. That is, when using the wind pressure correction device of this aspect, the sticking deviation of the electronic tag can be suppressed, and the concern of breakage of the electronic tag can also be reduced. In addition, since the wind pressure correction device is a non-contact type, that is, an influence on a surface of the corrugated cardboard sheet is small, and can correct the warpage. Accordingly, this configuration is preferable.

<Sixth Aspect>

The system of manufacturing an electronic tag-attached corrugated cardboard box according to any one of the first to fifth aspects, further including:

a printing part that performs printing to a surface that becomes an outer surface of the box as the workpiece, the workpiece in conveyance being a workpiece in the blank forming part or the assembly part; and a workpiece sensor that detects a position of the workpiece in conveyance on an upstream side of a sticking position of the electronic tag, in which the tag sticking device performs sticking of the electronic tag at sticking timing that is determined in correspondence with detection timing by the workpiece sensor.

(Operational Effect)

Sticking of the electronic tag can also be performed at constant timing. However, since a little deviation exists in workpiece conveyance timing in the blank forming part or the assembly part, when sticking the electronic tag to the workpiece at constant timing, a deviation occurs in a sticking position in the MD direction. The positional deviation itself in the MD direction is not unacceptable but for example, in a case where the printing part that performs printing to a surface that becomes an outer surface of the box as the workpiece is provided as in this aspect, there is a concern that the sticking deviation of the electronic tag becomes noticeable in comparison to a printing position, or a concern that printing and the electronic tag may overlap each other depending on the printing position. Here, as in this aspect, it is preferable that the workpiece sensor that detects a position of the workpiece is provided, and the electronic tag is stuck at sticking timing determined in correspondence with the detection timing of the workpiece sensor to prevent a deviation in the sticking position of the workpiece in the MD direction.

<Seventh Aspect>

The system of manufacturing an electronic tag-attached corrugated cardboard box according to any one of the first to sixth aspects, in which the tag sticking device includes a transfer roll capable of suctioning and releasing the electronic tag to and from an outer peripheral surface of the transfer roll, and a tag feeding device that sequentially feeds the electronic tag to the outer peripheral surface of the transfer roll, the workpiece is conveyed in a tangential direction of the outer peripheral surface of the transfer roll, and the electronic tag suctioned to the outer peripheral surface of the transfer roll is released at a contact position with the workpiece and is transferred to the workpiece.

(Operational Effect)

The sticking principle of the tag sticking device is not particularly limited, but when using the transfer roll as in this aspect, sticking can be stably performed at a high speed, and thus this configuration is preferable. In addition, in this case, the transfer roll can also be set as, for example, a die cutter, a slotter, a printing roll, or the like. In this case, the similar operational effect as in the eighth aspect can be exhibited.

<Eighth Aspect>

The system of manufacturing an electronic tag-attached corrugated cardboard box according to any one of the first to seventh aspects, further including:

a pair of rolls which sandwich the entirety of the workpiece in conveyance in a CD direction in a thickness direction, in which the tag sticking device sticks the electronic tag to the workpiece that is in a state of being sandwiched between the pair of rolls.

(Operational Effect)

For example, in a state where the workpiece is sandwiched between the pair of rolls, which sandwich the entirety of the workpiece in the CD direction in a thickness direction, such as the die cutter, the slotter, and the printing roll, the posture of the workpiece is stabilized, and correction of warpage can also be expected. Accordingly, it is preferable to stick the electronic tag in this state.

<Ninth Aspect>

The system of manufacturing an electronic tag-attached corrugated cardboard box according to any one of the first to eighth aspects, further including:

- a wind pressure pressing device that applies a wind pressure corresponding to a conveyance speed of the workpiece to a surface opposite to a surface provided with the adhesive portion in the electronic tag located at a sticking position.

(Operational Effect)

In a current typical system of manufacturing the corrugated cardboard box, a conveyance speed of the workpiece is extremely high, and thus there is a concern that the electronic tag may be obliquely stuck due to an influence of wind caused by workpiece transfer. In addition, as described above, there is a concern that breakage of the electronic tag may occur due to the oblique sticking. Here, as in this aspect, it is preferable that the wind pressure pressing device is provided to reduce an influence of wind caused by the workpiece transfer.

<Tenth Aspect>

A method of manufacturing an electronic tag-attached corrugated cardboard box, including:

- a corrugated cardboard sheet forming process of forming a corrugated cardboard sheet;
- a blank forming process of forming a box blank from the corrugated cardboard sheet;
- an assembly process of assembling the box blank into a flat plate-shaped corrugated cardboard box; and
- a product stacking process of stacking the flat plate-shaped corrugated cardboard box assembled in the assembly process,
- in which an electronic tag having an adhesive portion is stuck to a surface that becomes an outer surface of a box as a workpiece by using the adhesive portion between the corrugated cardboard sheet forming process and the product stacking process.

(Operational Effect)

The similar operational effect as in the first aspect can be exhibited.

According to the invention, there is an advantage that a concern of breakage of an electronic tag can be reduced, or the like.

BRIEF DESCRIPTION OF THE DRAWINGS

FIG. 1 is a block diagram of a system of manufacturing a corrugated cardboard box.

FIG. 2(*b*) illustrates an example of an electronic tag, in which is a side view.

FIG. 2(*c*) illustrates an example of an electronic tag, in which is a bottom view.

FIG. 3 is a front view illustrating a tag sticking device.

FIG. 4 is a front view illustrating the tag sticking device.

FIG. 5 is a front view illustrating an installation example of the tag sticking device and a workpiece sensor.

FIG. 6 is a plan view illustrating the principle of an electronic tag sticking deviation.

FIG. 7(*b*) is a front view illustrating an installation example of a wind pressure correction device.

FIG. 7(*c*) is a front view illustrating an installation example of a warpage correction roller.

FIG. 8(*b*) is a plan view illustrating an installation example of the wind pressure correction device.

FIG. 8(*c*) is a plan view illustrating an installation example of the warpage correction roller.

FIG. 9 is a front view illustrating an installation example of a wind pressure pressing device.

FIG. 10 is a perspective view of a folder gluer including the tag sticking device.

FIG. 11(*b*) is a view illustrating a folding part, in which is a front view.

FIG. 12 (*b*) is a side view of the folding part.

FIG. 13 (*b*) is a front view illustrating another installation example of the tag sticking device.

Figure 2A:
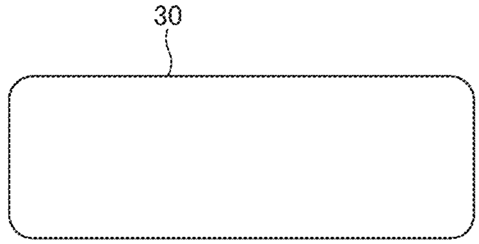
FIG. 2(*a*) illustrates an example of an electronic tag, in which is a plan view.

DETAILED DESCRIPTION (Example of System of Manufacturing Corrugated Cardboard Box)

FIG. 1 illustrates an example of a system of manufacturing a corrugated cardboard box. The system of manufacturing the corrugated cardboard box includes a corrugated cardboard sheet forming part 10 and a box forming part 20. The corrugated cardboard sheet forming part 10 is a part that sequentially forms the corrugated cardboard sheet of one box. The corrugated cardboard sheet forming part 10 in the illustrated example forms a strip-shaped double-sided corrugated cardboard sheet 12*p* that is continuous in an MD direction by a single facer 11 and a double facer 12 as in a similar manner as in a typical corrugator. After the double-sided corrugated cardboard sheet is cut off in a direction parallel to the MD direction by a slitter scorer 13 and a ruled line is drawn, the double-sided corrugated cardboard sheet is cut off with predetermined intervals in the MD direction by a cut-off machine 14 to sequentially form a corrugated cardboard sheet 14*p* of one box. The corrugated cardboard sheet 14*p* is stacked in a thickness direction by a sheet stacker 15. Although not illustrated, it is needless to say that a mill roll stand, an auto splicer, a liner cutting device, a bridge, a glue machine (a device that applies adhesive to a single-sided corrugated cardboard in front of an inlet of the double facer), a cutting tape device, or the like may be provided as necessary.

On the other hand, the box forming part 20 is a part that assembles a flat plate-shaped (folded state) corrugated cardboard box from the corrugated cardboard sheet 14*p* formed by the corrugated cardboard sheet forming part 10. In the box forming part 20 in the illustrated example, printing to a surface that becomes an outer surface of a box is performed by a printer 21 such as flexography, ruled line and grooving processing is performed by a ruled line processing device 22 and a slotter 23, a hand gripper hole or an H cut is punched by a die cutter 24 to form a box blank 24*p*. Continuously, the box blank 24*p* (folding part) is folded and joints are joined by a folder gluer 25 to form a flat plate-shaped corrugated cardboard box 25*p*, the flat plate-shaped corrugated cardboard box 25*p* is stacked in a thickness direction by a product stacker 26, and the flat plate-shaped corrugated cardboard boxes 25*p* stacked in a constant amount are bound by a binding device 27. In this case, the printer 21 is a printing part, and a part ranging from the printer 21 to the ruled line processing device 22 and the slotter 23 becomes a blank forming part 20B that forms the box blank 24*p*, and the folder gluer 25 becomes an assembly part that assembles the box blank 24*p* into the flat plate-shaped corrugated cardboard box.

The printer 21, the ruled line processing machine and the slotter 23 may be an integrated processing machine as in a so-called printer slotter. Almost the entirety of the box forming part 20 may be a continuous processing device that performs processing by each device while continuously conveying the workpiece 50 as in a so-called flexo-folder gluer. In addition, in the case of not performing printing to the corrugated cardboard box, the printer 21 may be omitted. In addition, a one-touch gluer may be employed instead of the folder gluer 25, or joining of joints may be performed by a stitcher so as to manufacture a corrugated cardboard box having a special shape. As can be seen from the description, the term "folder gluer" has meaning including both a case where the folder gluer is a device different from the printer 21 or the like, and a case where the folder gluer is a part included in the flexo-folder gluer.

The system of manufacturing the corrugated cardboard box described above is illustrative only, and can be modified within a range without an influence on the invention.

(Tag Sticking Device)

In the system of manufacturing the corrugated cardboard box as described above, when sticking an electronic tag 30 having an adhesive portion 31 to a surface that becomes an outer surface of a box as a workpiece by using the adhesive portion 31 between the corrugated cardboard sheet forming part 10 and the product stacker 26 (product stacking part) by a tag sticking device 40, a concern of breakage of the electronic tag 30 due to a force or heat becomes less, and thus this configuration is preferable. In addition, since it is easy to visually recognize the electronic tag 30 stuck to the outer surface of the corrugated cardboard box, when performing reading/writing of information of the electronic tag 30, it is easy not only to align a reader/writer to the electronic tag 30 at an appropriate position, but also to confirm whether or not the electronic tag 30 is normally stuck.

Figure 2B:
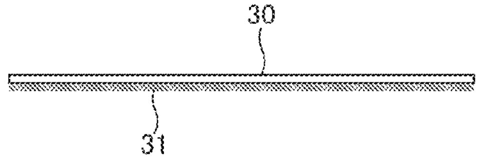
Figure 2C:
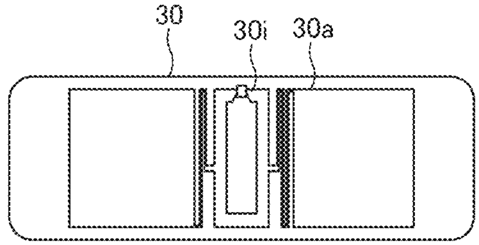

As long as the electronic tag 30 has the adhesive portion 31 at a part or the entirety of a rear surface, and is stuck to the workpiece 50 by using the adhesive portion 31, a shape and a structure of the electronic tag 30 is not particularly limited, and a known electronic tag 30 can be appropriately used. For example, the shape of the electronic tag 30 is typically a cornered rectangular shape as in an example illustrated in FIG. 2(*a*) to FIG. 2(*c*), but may be an appropriate shape without limitation thereto. In addition, a representative one of the electronic tag 30 is, for example, a passive type electronic tag 30 including an IC chip 30*i* as inlets 30*a* and 30*i* and an antenna 30*a* connected thereto as illustrated in FIG. 2(*c*), but there is no limitation thereto.

A sticking position of the electronic tag 30 (an installation position of the tag sticking device 40) is not particularly limited as long as the sticking position is a location between the corrugated cardboard sheet forming part 10 and the product stacker 26 and where the workpiece is conveyed in a direction along a surface that becomes an outer surface of the box. For example, sticking of the electronic tag 30 can be performed at, (a) The vicinity of an inlet, the inside, or the vicinity of an outlet of the printer 21 or the slotter 23, (b) A position before application of adhesive, a position after application of adhesive and before folding, a position in the course of folding, or a position after joint joining in the folder gluer 25, (c) The vicinity of an inlet of the product stacker 26, or the like.

For example, the tag sticking device 40 may be set as a known industrial robot such as a parallel link robot, a vertical articulated robot, a horizontal articulated robot, and an orthogonal robot as described in Patent Document 3. However, in the system of manufacturing the corrugated cardboard box, there are many locations where the workpiece is conveyed in a direction along a surface that becomes an outer surface of a box (for example, the corrugated cardboard sheet or the box blank 24*p* is conveyed in a state of being laid down in the MD direction). Accordingly, when sticking the electronic tag 30 to the workpiece in conveyance in a stable posture as described above, simplification of a device, an increase in a manufacturing speed, stabilization of sticking, and the like can be realized, and thus this configuration is preferable. For example, in this case, a tag sticking device 40 to which a labeler is applied can be suitably used as illustrated in FIG. 3.

The tag sticking device 40 illustrated in FIG. 3 is an example that is appropriate to stick the electronic tag 30 to the workpiece 50 in conveyance in a direction along a surface that becomes an outer surface of the box, and a tag roll 41 is attached and used. The tag roll 41 is obtained by winding a continuous strip-shaped tag sheet 42 in a roll shape, and the tag sheet 42 includes the electronic tag 30 that can be stuck repeatedly with a predetermined interval in a continuous direction of a continuous strip-shaped release sheet 43. A tag roll 23R is rotatably supported to a rotational shaft (not illustrated), and the electronic tag 30 can be replenished or the kind of the electronic tag 30 can be changed by replacing the tag roll 23R at any time.

In this tag sticking device 40, the tag sheet 42 unwound from the tag roll 41 is intermittently conveyed at sticking timing to the workpiece 50, and is conveyed to a folding-back guide 44 (may be a rotation shaft or non-rotating shaft in addition to a plate shape as in the illustrated example). At a tip end of the folding-back guide 44, a release sheet 43 is guided to be folded to a side opposite to a side where the electronic tag 30 is provided. In addition, at the time of the folding, the adhesive portion 31 of the electronic tag 30 having rigidity protrudes from a tip end of the folding-back guide 44 toward a surface of the workpiece 50 passing through a lower side of the tip end while being naturally peeled off from the release sheet 43, and is stuck to the surface of the workpiece 50 sequentially from the protruding end. Particularly, in the case of sticking the electronic tag to the workpiece 50 that moves at a high speed, as in the illustrated example, it is preferable to include a sticking roller 45 that presses the electronic tag 30 stuck to the workpiece 50 against the workpiece 50, but an air blowing device may be provided instead of the sticking roller 45. The release sheet 43 that remains after the electronic tag 30 is peeled off is wound around a winding shaft 46. The winding shaft 46 is rotationally driven by a stepping motor (not illustrated), and winding is performed intermittently so that the electronic tag 30 is peeled off from the release sheet 43 sheet by sheet at sticking timing to the workpiece 50, and is stuck to the workpiece 50.

As another tag sticking device 400, there is suggested a configuration which includes a transfer roll 401 capable of suctioning and releasing the electronic tag 30 to an outer peripheral surface and a tag feeding device 402 that sequentially feeds the electronic tag 30 to the outer peripheral surface of the transfer roll 401 as illustrated in FIG. 4, and in which the workpiece 50 is conveyed in a tangential direction of the outer peripheral surface of the transfer roll 401, and the electronic tag suctioned to the outer peripheral surface of the transfer roll 401 is released at a contact position with the workpiece 50 and is transferred to the workpiece 50. In the illustrated example, ventilation holes passing in a thickness direction are arranged with intervals over approximately the entirety of an outer peripheral wall of the transfer roll 401. In addition, an inner space of the transfer roll 401 includes a vacuum suction chamber 403 that is provided in a range of a rotational direction from a reception position of the electronic tag 30 to a sticking position with respect to the workpiece 50, and a non-suction chamber 404 provided in a range of the rotational direction from the sticking position with respect to the workpiece 50 to the reception position of the electronic tag 30. According to this, at the reception position of the electronic tag 30, the electronic tag 30 fed from the tag feeding device 402 is suctioned to an outer peripheral surface of the transfer roll 401 due to suction of the inside of the transfer roll 401, and the electronic tag 30 arriving at the sticking position with respect to the workpiece 50 due to rotation of the transfer roll 401 is released from the suction and is stuck to the workpiece 50 at the outer peripheral surface of the transfer roll 401. When using the transfer roll 401, sticking can be stably performed at a high speed, and thus this configuration is preferable. In addition, in this case, the transfer roll 401 may be set, for example, as the die cutter 24, the slotter 23, a printing roll, or the like. When the transfer roll 401 is set as the printing roll, a sticking deviation of the electronic tag 30 with respect to the printing position does not occur. The tag feeding device 402 is not particularly limited, and the tag feeding device 402 illustrated in FIG. 4 is similar to the tag sticking device 40 illustrated in FIG. 3 except that the electronic tag 30 is fed to the surface of the transfer roll 401 in a facing down state (that is, the surface that does not have the adhesive portion 31 faces the transfer roll 401 side), and thus the same reference numeral will be given thereto and description thereof will be omitted. Note that, in this example, a configuration in which the electronic tag 30 is suctioned to the rotary type transfer roll 401 is exemplified. However, there is no limitation thereto, and it is possible to employ a configuration in which the electronic tag 30 is suctioned to a part of a flat plate type die cutter or a flat plate type printing original plate and is transferred to the workpiece 50.

Timing of sticking the electronic tag 30 to the workpiece 50 can be appropriately determined. However, since a slight deviation may occur in conveyance timing of the workpiece 50 in the blank forming part 20B or the assembly part (the folder gluer 25 in the illustrated example), in the case of sticking the electronic tag 30 to the workpiece 50 at constant timing, a deviation occurs in a sticking position in the MD direction. The positional deviation itself in the MD direction is not unacceptable but for example, in a case where the printer 21 that performs printing to a surface that becomes an outer surface of the box as the workpiece 50 is provided as described above, there is a concern that the sticking deviation of the electronic tag 30 becomes noticeable in comparison to a printing position, or a concern that printing and the electronic tag 30 may overlap each other depending on the printing position. Accordingly, as illustrated in FIG. 5, it is preferable that a workpiece sensor 47 (not illustrated) that detects a position (for example, a position of a downstream end in a conveyance direction) of the workpiece 50 in conveyance is provided upstream of the sticking position by the tag sticking device 40, and the electronic tag 30 is stuck by the tag sticking device at sticking timing determined in correspondence with the detection timing to prevent the deviation of the sticking position in the MD direction in the workpiece 50. As the workpiece sensor 47, a known contact type sensor can also be used in addition to a known non-contact type sensor such as a transmission sensor and a reflection sensor. The detection position (installation position) of the workpiece sensor 47 can be appropriately determined. However, for example, in the case of sticking the electronic tag 30 in the folding part of the folder gluer 25, the detection position can be set between a conveyance initiation position of the box blank 24*p* and the sticking position of the electronic tag 30.

As described above, the corrugated cardboard sheet warps due to a difference in moisture, tension, or the like between upper and lower liners (upward warpage, downward warpage, S-shaped warpage, twist warpage, or the like, refer to JCS (Standard of the Japan Corrugated Case Association) 10003-2000, Corrugated fibreboard—Measurement for warp). Accordingly, in the case of sticking the electronic tag 30 to the outer surface of the corrugated cardboard box in the system of manufacturing the corrugated cardboard box, the warpage of the corrugated cardboard sheet has an influence on the sticking deviation as to be described below, and there is a concern that the warpage has an influence on breakage of the electronic tag 30. That is, as illustrated in a right drawing in FIG. 6, when considering a case where the workpiece 50 having warpage (in the illustrated example, upward warpage in which both ends in the CD direction are raised toward a front side of the drawing in comparison to the center) on a sticking surface is moving in the MD direction, and the adhesive portion 31 of the electronic tag 30 is brought into contact with the sticking surface, in the adhesive portion 31 of the electronic tag 30, a portion 31*c* closest to the sticking surface is stuck first, and the remaining portion is stuck with a delay. Here, when sticking timing is different in the CD direction, the portion 31*c* stuck to the electronic tag 30 for the first time starts to move first in combination with the workpiece 50 as indicated by an arrow, and the remaining portion follows the portion 31*c*. As a result, the electronic tag 30 may be obliquely stuck as illustrated in a left drawing. In addition, the electronic tag 30 includes the IC chip 30*i* and the antenna 30*a* that is electrically connected thereto, and thus when a force other than an assumed force is added to a connection portion between the IC chip 30*i* and the antenna 30*a*, the connection portion is peeled off, and there is a concern that a conduction failure may occur. That is, as described above, in a situation in which a portion closest to the sticking surface in the adhesive portion 31 of the electronic tag 30 is stuck first, and the remaining portion is stuck with a delay, a force of twisting the electronic tag 30 acts on the connection portion between the IC chip 30*i* and the antenna 30*a* from sticking initiation to sticking completion, and the force is likely to concentrate on the connection portion between the IC chip 30*i* and the antenna 30*a*. Therefore, there is a concern that peeling-off of the connection portion between the IC chip 30*i* and the antenna 30*a* may be caused to occur.

Figure 7A:
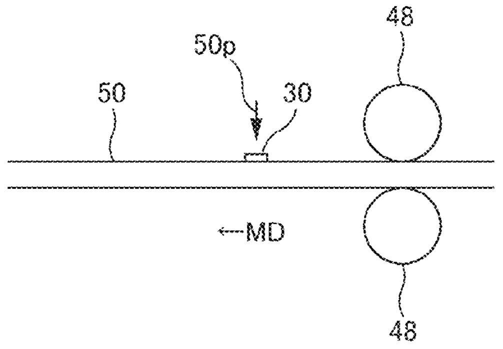
FIG. 7(*a*) is a front view illustrating an installation example of a warpage correction roller.
Figure 7B:
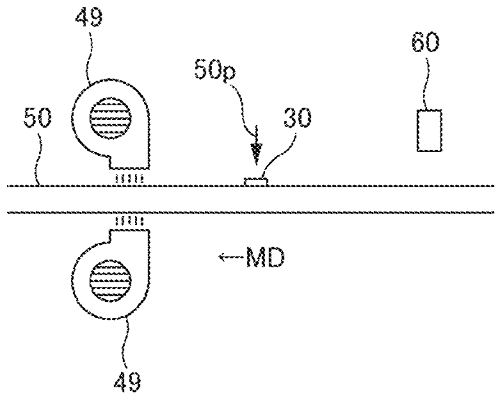
Figure 7C:
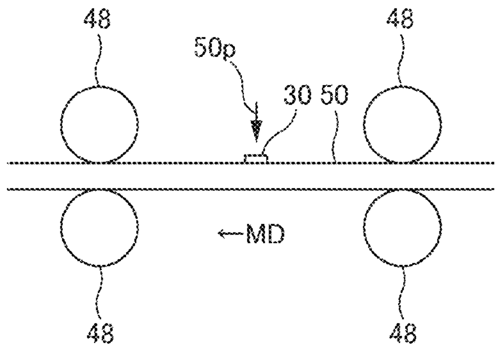

Here, as illustrated in FIGS. 7(*a*) and 7(*c*), it is preferable to provide a correction roller 48 that comes into contact with the sticking surface for the electronic tag 30 and the opposite surface in the workpiece 50, and corrects warpage of the sticking surface at a sticking position 50*p* of the electronic tag 30. As illustrated in FIG. 7(*b*), a wind pressure correction device 49 that applies a wind pressure to the sticking surface for the electronic tag 30 and the opposite surface in the workpiece 50 (sprays air), and corrects warpage of the sticking surface at the sticking position 50*p* of the electronic tag 30 may be provided. When the warpage correction unit is provided, the sticking deviation of the electronic tag 30 can be suppressed, and the concern of breakage of the electronic tag 30 can also be reduced. Particularly, as the wind pressure correction device 49, a blower (blowing fan) or a compressed air injection device can be used. Since the wind pressure correction device 49 is a non-contact type, that is, an influence on a surface of the corrugated cardboard sheet is small, and can correct the warpage, this configuration is preferable. In addition, in the case of using the wind pressure correction device 49, it is also preferable that a warpage measurement sensor 60 (for example, a plurality of distance sensors configured to measure a distance to the sticking surface of the workpiece 50 are arranged in the CD direction with appropriate intervals) that measures warpage in the sticking position 50*p* of the electronic tag and the vicinity thereof is provided, and a wind pressure is controlled in correspondence with the measurement result to reduce the warpage. Particularly, when individually controlling a wind pressure that is applied to the sticking surface for the electronic tag 30 and the opposite surface, more accurate warpage correction is possible.

Figure 8A:
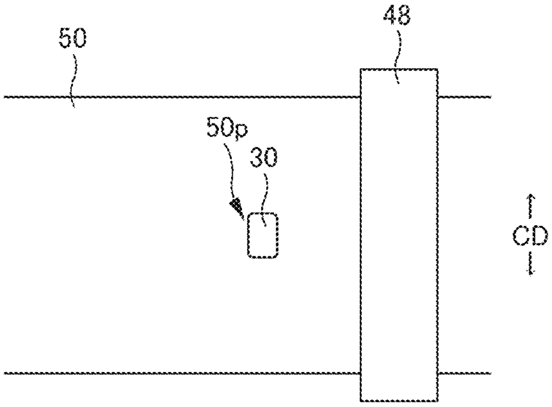
FIG. 8(*a*) is a plan view illustrating an installation example of the warpage correction roller.
Figure 8B:
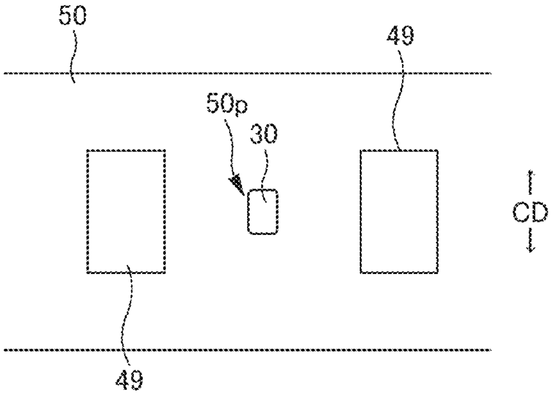
Figure 8C:
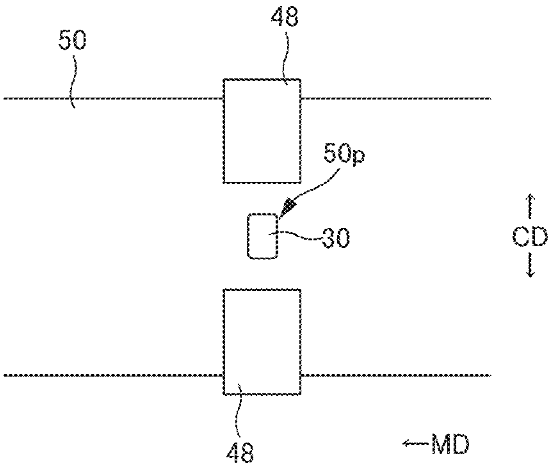

The warpage correction units 48 and 49 may be formed in the vicinity of an upstream side (FIG. 7(*a*)), in the vicinity of a downstream side (FIG. 7(*b*)), or in the vicinity of both the upstream side and the downstream side (FIG. 7(*c*)) of the sticking position of the electronic tag 30 in the MD direction as long as warpage of the sticking surface for the electronic tag 30 in the workpiece 50 can be corrected. In addition, in the CD direction, the contact position of the correction roller 48 and the spraying position of the wind pressure correction device may be only a portion through which the sticking position of the electronic tag 30 passes (FIG. 8(*b*)), a wide range including the portion (for example, the entirety of the CD direction of the workpiece 50 as illustrated in FIG. 8(*a*)), or only a portion through which the sticking position of the electronic tag 30 does not pass (for example, only the vicinity of the sticking position of the electronic tag 30 in the workpiece 50 as illustrated in FIG. 8(*c*)). In addition, the contact surface of the correction roller 48 and the spray surface of the wind pressure correction device 49 may be any one of the sticking surface for the electronic tag 30 and the opposite surface in the workpiece 50.

Although not illustrated, the warpage measurement sensor 60, which supports the tag sticking device 40 through a posture control device so that the posture of the tag sticking device 40 can vary at least in the CD direction (preferably, all directions) and measures warpage at the sticking position of the electronic tag 30 and in the vicinity of the sticking position, may be provided, and posture control of the tag sticking device 40 may be performed in correspondence with the measurement result so that an adhesive initiation position of the adhesive portion 31 of the electronic tag 30 and the sticking surface for the electronic tag 30 in the workpiece 50 become parallel to each other. The posture control can be used instead of the warpage correction units 48 and 49 or in combination therewith.

In addition to the warpage of the workpiece 50, the cause of the sticking deviation of the electronic tag 30 is also considered. That is, since a conveyance speed of the workpiece 50 in a current typical system of manufacturing the corrugated cardboard box is extremely high, there is a concern that the electronic tag 30 may be obliquely stuck due to an influence of wind caused by the conveyance of the workpiece 50. In addition, there is a concern that the electronic tag 30 may be broken due to the oblique sticking as described above. Here, as illustrated in FIG. 9, it is preferable that a wind pressure pressing device 70 that applies a wind pressure corresponding to the conveyance speed of the workpiece 50 to a surface opposite to the surface provided with the adhesive portion 31 in the electronic tag 30 located at the sticking position is installed to reduce an influence of wind caused by the conveyance of the workpiece 50. At this time, a database storing wind pressure data of the conveyance speed of the workpiece 50 or a wind pressure for cancelling the influence of wind caused in correspondence with the workpiece 50 and the conveyance speed of the workpiece 50 may be provided in a main body, and it is convenient to automatically control the wind pressure of the wind pressure pressing device 70 by using values of the database in correspondence with an operation situation of the system. Note that, results of the wind pressure control may be appropriately sampled, and the values of the database may be corrected in a case where a deviation has occurred. The wind pressure pressing device 70 can be used instead of the warpage correction units 48 and 49, or in combination therewith.

(Installation Example of Tag Sticking Device in Folding Part)

Figure 11A:
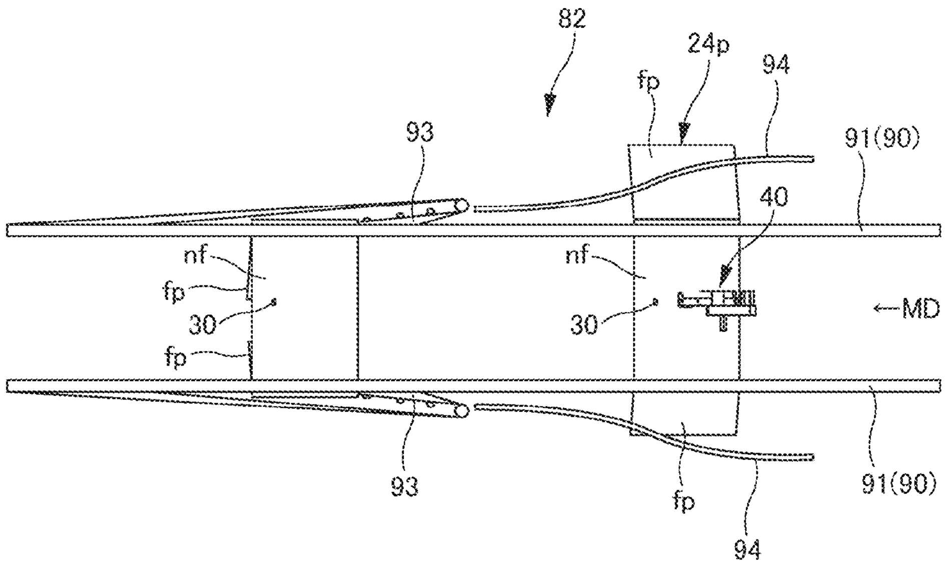
FIG. 11(*a*) is a view illustrating a folding part, in which is a plan view.
Figure 11B:
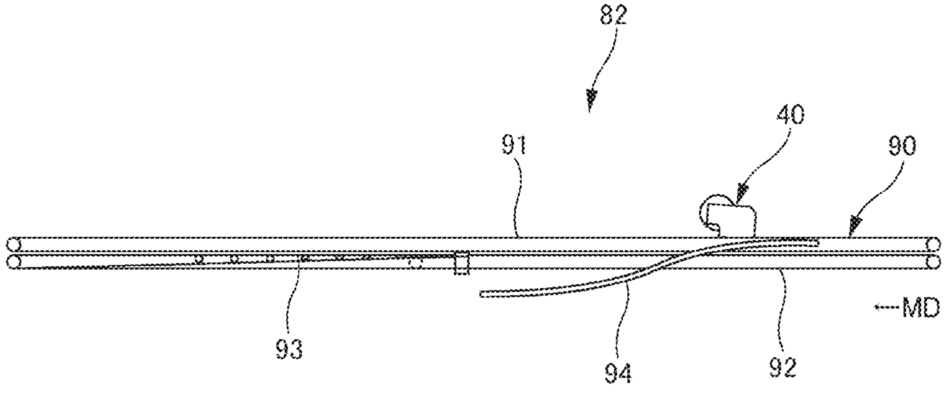

FIG. 10 and FIG. 11 illustrate an installation example of the tag sticking device 40 with respect to a folding part 82 of the folder gluer 25. The folder gluer 25 of this example has a typical configuration including a blank feeding part 81 that feeds the box blank 24*p* to the folding part 82, the folding part 82, and a joint joining part 83 that compresses and joins joint portions. The blank feeding part 81 is configured to perform gluing to joints portions located at one end in the CD direction by a gluing device (not illustrated) in a process of conveying the box blank 24*p* to the folding part 82.

The folding part 82 of this example is configured to fold a folding portion fp of the box blank 24*p* passing through an outer side in the CD direction in comparison to a pair of nipping conveyance devices 90 toward a central side in the CD direction while conveying the box blank 24*p* in the MD direction by the pair of nipping conveyance devices 90 spaced apart from each other in the CD direction with a non-folding portion of of the box blank 24*p* sandwiched therebetween in a thickness direction. The nipping conveyance devices 90 are configured to sandwich the box blank 24*p* between an upper endless belt 91 and lower endless belts 92 and 93 which come into contact with a lower surface of the upper endless belt 91. A ruled line of the box blank 24*p* folded by the folding part 82 is located in the vicinity of an outer side of the nipping conveyance devices 90 in the CD direction, and the folding portion fp of the box blank 24*p* on an outer side in the CD direction in comparison to the ruled line is folded to a lower side and a central side in the CD direction by a guide device.

A configuration of the guide device is not particularly limited. In this example, the upper endless belt 91 extends over the entirety of the folding part 82 in the MD direction, and the lower endless belts 92 and 93 include a first lower endless belt 92 located on an upstream side in the MD direction, and a second lower endless belt 93 located on a downstream side. In addition, a conveyance range of the first lower endless belt 92 is provided with a guide bar 94 that extends in a curved shape so as to gradually enter a lower side of the nipping conveyance device 90 as going from an outer side of the nipping conveyance device 90 in the CD direction toward the downstream side in the MD direction, and the folding portion of the box blank 24*p* comes into contact with the guide bar 94 first and can be folded by approximately 90°. In addition, in the conveyance range of the second lower endless belt 93, a conveyance surface of the second lower endless belt 93 is guided to gradually enter a lower side of the upper endless belt 91 as going from an outer side of the folding portion of the box blank 24*p* in the CD direction to the downstream side in the MD direction. The folding portion of the box blank 24*p* which has been folded by approximately 90° subsequently comes into contact with the second lower endless belt 93 and can be folded up to a final state. That is, the guide device of this example is constituted by the guide bar 94 and the second lower endless belt 93. A configuration in which the entirety of the guide device is constituted by the lower endless belts 92 and 93, a configuration in which a folding direction is vertically inversed, and the like are known, and the known changes can be employed.

In the case of installing the tag sticking device 40 in the folding part 82, a sticking position in the CD direction is not particularly limited. However, as the illustrated example, in a configuration in which the electronic tag 30 is stuck to the non-folding portion of passing between the pair of nipping conveyance devices 90 in the box blank 24*p*, it is easy not only to install the tag sticking device 40, but also to stick the electronic tag 30 since a conveyance posture of the box blank 24*p* is stable. In addition, as described above, in order to reduce the influence on warpage of the workpiece 50, it is preferable to set a less warpage portion, for example, the vicinity of the nipping conveyance devices 90 or the central portion of the pair of nipping conveyance devices 90 in the CD direction as the sticking position of the tag sticking device 40.

In addition, the sticking position in the MD direction in the folding part 82 can be appropriately determined, but it is preferable to stick the electronic tag 30 at a less warpage portion, for example, before the box blank 24*p* starts to be folded, or at a position (illustrated example) where a folding angle with respect to a horizontal direction is less than 45°.

Figure 12A:
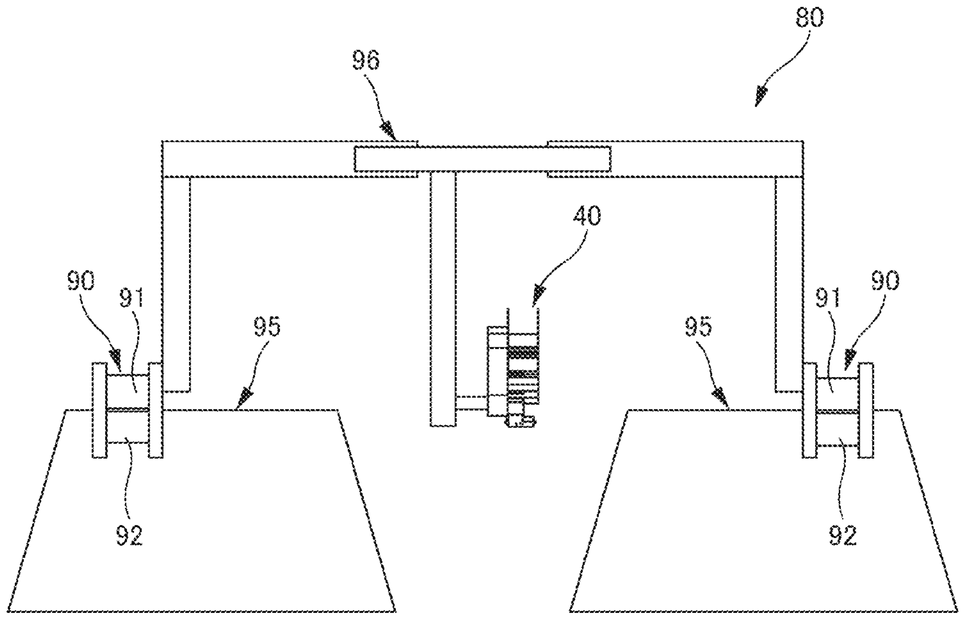
FIG. 12 (*a*) is a side view of the folding part.
Figure 12B:
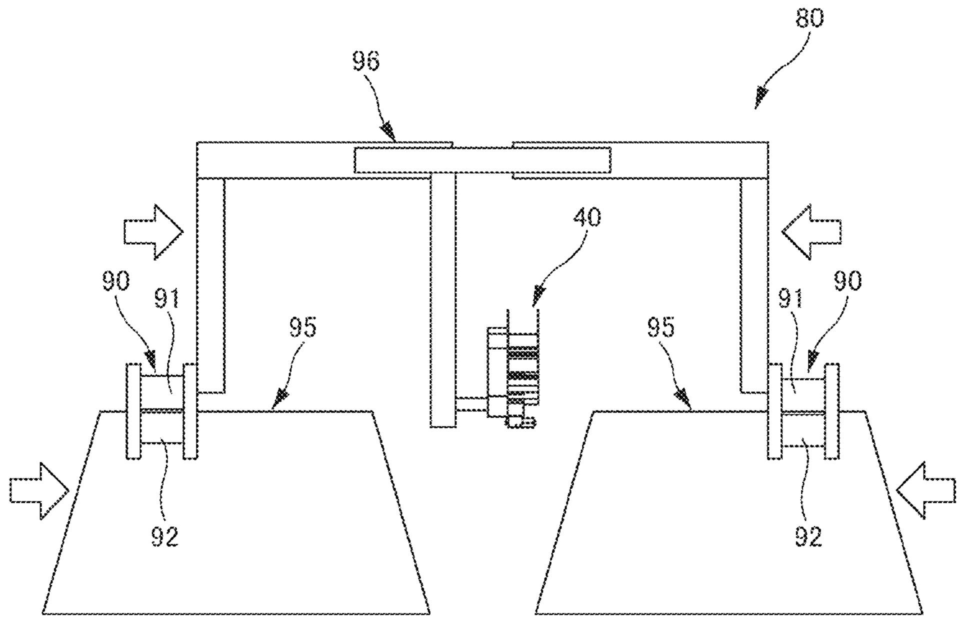

In the folding part 82, an interval between a pair of frames 95, which respectively support the pair of nipping conveyance devices 90, in the CD direction is set to be adjustable so as to adjust the interval in the CD direction of the pair of nipping conveyance devices 90 in correspondence with a size change of the corrugated cardboard box. In the folding part 82, as illustrated in FIG. 12, the tag sticking device 40 is supported to each of the pair of frames 95 through an extendible frame 96 that is extendible in the CD direction, and when the interval between the pair of frames 95 in the CD direction is adjusted by an adjustment device, the extendible frame extends or contacts in correspondence with the adjustment, and the position of the tag sticking device 40 is maintained. In addition, when the size of the corrugated cardboard box is changed, adjustment of an installation position of the tag sticking device 40 is not necessary or becomes simple, and thus the configuration is preferable.

In addition, the folding part 82 is a device having a large vibration, and thus it is preferable that the tag sticking device 40 is attached to the folding part 82 through a vibration absorbing elastic body such as a rubber and a spring, or a vibration absorbing device such as oil pressure or air.

(Another Installation Example of Tag Sticking Device)

Figure 13A:
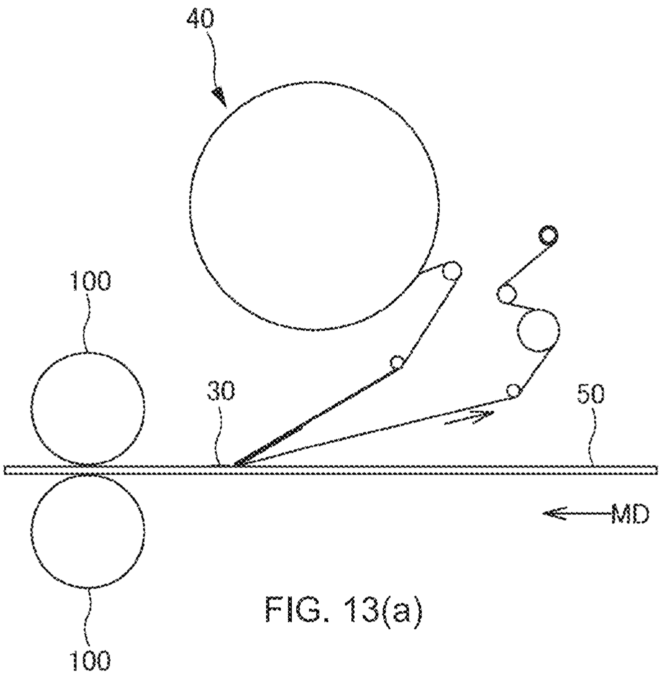
FIG. 13 (*a*) is a front view illustrating another installation example of the tag sticking device.
Figure 13B:
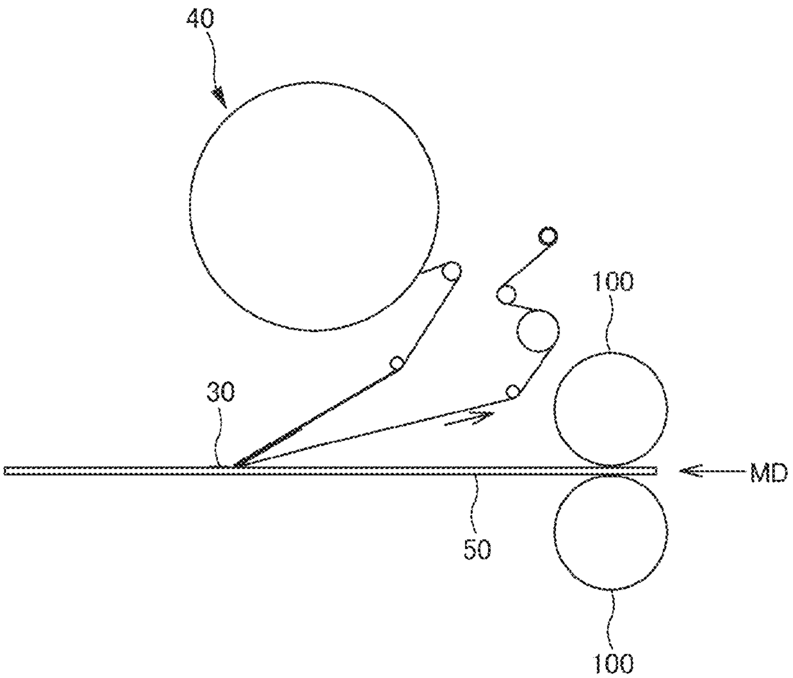

In the case of installing the tag sticking device 40 to a part other than the folding part 82, in a device including a pair of rolls 100 which sandwich the entirety of the workpiece 50 in conveyance in the CD direction in a thickness direction as illustrated in FIG. 13, it is preferable to install the tag sticking device 40 to stick the electronic tag 30 to the workpiece 50 in a state of being sandwiched between the pair of rolls 100. That is, in a state where the workpiece 50 is sandwiched between the pair of rolls 100, which sandwich the entirety of the workpiece 50 in the CD direction in the thickness direction, such as the die cutter 24, the slotter 23, and the printing roll, the posture of the workpiece 50 is stabilized, and correction of warpage can also be expected. Accordingly, when sticking the electronic tag 30 in this state, more stable sticking of the electronic tag 30 is possible at a higher speed.

INDUSTRIAL APPLICABILITY

The invention can be used to a system of manufacturing an electronic tag-attached corrugated cardboard box to which an electronic tag having an adhesive portion is stuck.

REFERENCE SIGNS LIST

10 Corrugated cardboard sheet forming part
10*a*, 10*i* Inlet
11 Single facer
12 Double facer
12*p* Double-sided corrugated cardboard sheet
13 Slitter scorer
14 Cut-off machine
14*p* Corrugated cardboard sheet of one box
15 Sheet stacker
20 Box forming part
21 Printer
22 Ruled line processing device
23 Slotter
24 Die cutter
24*p* Box blank
25 Folder gluer
25*p* Flat plate-shaped corrugated cardboard box
26 Product stacker
27 Binding device
30 Electronic tag
30*a* Antenna
30*i* IC chip
31 Adhesive portion
40 Tag sticking device
401 Transfer roll
402 Tag feeding device
44 Folding-back guide
45 Sticking roller
46 Winding shaft
47 Workpiece sensor
48 Correction roller
49 Wind pressure correction device
50 Workpiece
60 Warpage measurement sensor
70 Wind pressure pressing device
82 Folding part
81 Blank feeding part
83 Joint joining part
90 Nipping conveyance device

91 Upper endless belt
92, 93 Lower endless belt
92 First lower endless belt
93 Second lower endless belt
94 Guide bar
95 Frame
96 Extendible frame

The invention claimed is:

1. A system of manufacturing an electronic tag-attached corrugated cardboard box, comprising:
a corrugated cardboard sheet forming part that forms a corrugated cardboard sheet of the electronic tag-attached corrugated cardboard box by cutting at a predetermined interval;
a blank forming part that forms a box blank from the corrugated cardboard sheet;
an assembly part that assembles the box blank into a flat plate-shaped corrugated cardboard box;
a product stacking part that stacks the flat plate-shaped corrugated cardboard box assembled in the assembly part; and
a tag sticking device, provided between the corrugated cardboard sheet forming part and the product stacking part, that sticks an electronic tag having an adhesive portion to a surface that becomes an outer surface of a box as a workpiece by using the adhesive portion.

2. The system of manufacturing an electronic tag-attached corrugated cardboard box according to claim 1,
wherein the assembly part includes a folding part that folds the box blank,
the folding part folds a folding portion of the box blank that passes through an outer side in a CD direction in comparison to a pair of nipping conveyance devices toward a central side in the CD direction while conveying the box blank in an MD direction by the pair of nipping conveyance devices spaced apart from each other in the CD direction with a non-folding portion of the box blank sandwiched therebetween in a thickness direction, and
the tag sticking device sticks the electronic tag to a portion passing between the pair of nipping conveyance devices in the box blank.

3. The system of manufacturing an electronic tag-attached corrugated cardboard box according to claim 2,
wherein the folding part includes a pair of frames supporting the pair of nipping conveyance devices, respectively, and an interval between the frames in the CD direction is set to be adjustable,
the tag sticking device is supported to each of the pair of frames through an extendible frame that is extendible in the CD direction, and
when the interval between the pair of frames in the CD direction is adjusted by an adjustment device, the extendible frame extends or contracts in correspondence with the adjustment, and a position of the tag sticking device is maintained.

4. The system of manufacturing an electronic tag-attached corrugated cardboard box according to claim 1, further comprising:
a correction roller that comes into contact with at least one of a sticking surface for the electronic tag and the opposite surface in the workpiece, and corrects warpage of the sticking surface at a sticking position of the electronic tag.

5. The system of manufacturing an electronic tag-attached corrugated cardboard box according to claim 1, further comprising:
a wind pressure correction device that applies a wind pressure to at least one of a sticking surface for the electronic tag and the opposite surface in the workpiece, and corrects warpage of the sticking surface at a sticking position of the electronic tag.

6. The system of manufacturing an electronic tag-attached corrugated cardboard box according to claim 1, further comprising:
a printing part that performs printing to a surface that becomes an outer surface of the box as the workpiece, the workpiece in conveyance being a workpiece in the blank forming part or the assembly part; and
a workpiece sensor that detects a position of the workpiece in conveyance on an upstream side of a sticking position of the electronic tag,
wherein the tag sticking device performs sticking of the electronic tag at sticking timing that is determined in correspondence with detection timing by the workpiece sensor.

7. The system of manufacturing an electronic tag-attached corrugated cardboard box according to claim 1,
wherein the tag sticking device includes a transfer roll capable of suctioning and releasing the electronic tag to and from an outer peripheral surface of the transfer roll, and a tag feeding device that sequentially feeds the electronic tag to the outer peripheral surface of the transfer roll, the workpiece is conveyed in a tangential direction of the outer peripheral surface of the transfer roll, and the electronic tag suctioned to the outer peripheral surface of the transfer roll is released at a contact position with the workpiece and is transferred to the workpiece.

8. The system of manufacturing an electronic tag-attached corrugated cardboard box according to claim 1, further comprising:
a pair of rolls which sandwich the entirety of the workpiece in conveyance in a CD direction in a thickness direction,
wherein the tag sticking device sticks the electronic tag to the workpiece that is in a state of being sandwiched between the pair of rolls.

9. The system of manufacturing an electronic tag-attached corrugated cardboard box according to claim 1, further comprising:
a wind pressure pressing device that applies a wind pressure corresponding to a conveyance speed of the workpiece to a surface opposite to a surface provided with the adhesive portion in the electronic tag located at a sticking position.

10. A method of manufacturing an electronic tag-attached corrugated cardboard box, comprising:
a corrugated cardboard sheet forming process of forming a corrugated cardboard sheet of the electronic tag-attached corrugated cardboard box by cutting at a predetermined interval;
a blank forming process of forming a box blank from the corrugated cardboard sheet;
an assembly process of assembling the box blank into a flat plate-shaped corrugated cardboard box; and
a product stacking process of stacking the flat plate-shaped corrugated cardboard box assembled in the assembly process,
wherein, at a stage between the corrugated cardboard sheet forming process and the product stacking process, an electronic tag having an adhesive portion is stuck to a surface that becomes an outer surface of a box as a workpiece by using the adhesive portion.

* * * * *